S. V. DE BOLOTOFF.
VALVE.
APPLICATION FILED FEB. 24, 1920.

1,380,867.

Patented June 7, 1921.
2 SHEETS—SHEET 1.

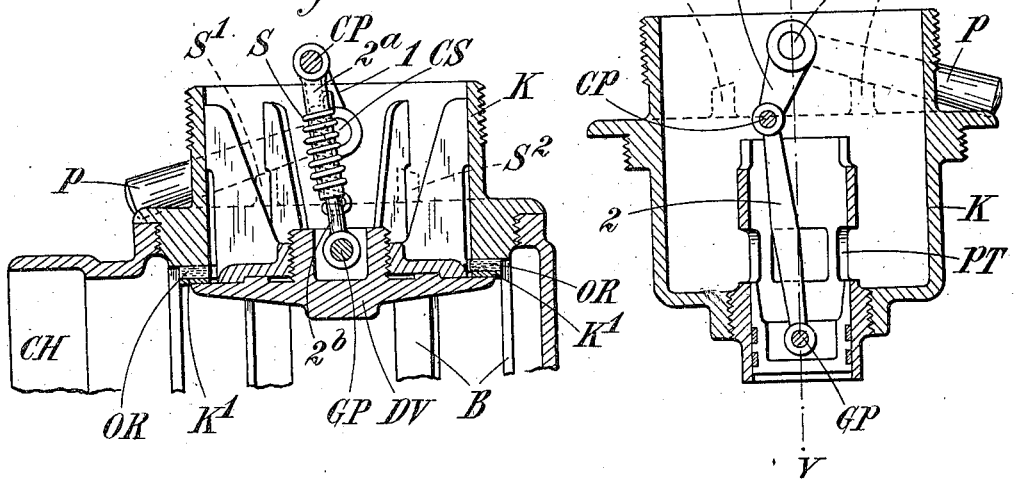
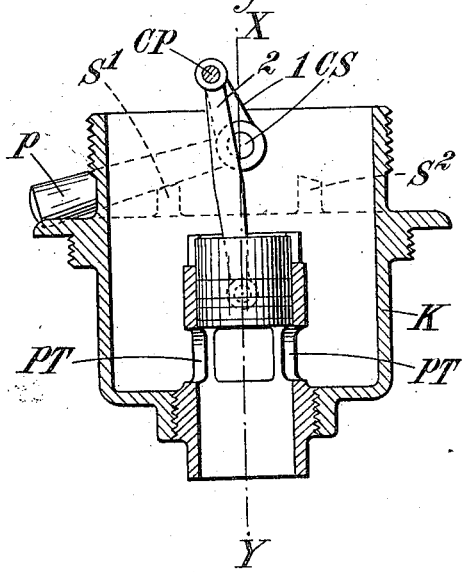

UNITED STATES PATENT OFFICE.

SERGE VINCENT DE BOLOTOFF, OF ROEHAMPTON, LONDON, ENGLAND.

VALVE.

1,380,867.  Specification of Letters Patent.  Patented June 7, 1921.

Application filed February 24, 1920. Serial No. 360,914.

*To all whom it may concern:*

Be it known that I, SERGE VINCENT DE BOLOTOFF, a Russian subject, residing at Roehampton, in London, England, have invented certain new and useful Improvements in Valves, of which the following is a specification.

This invention relates to valves.

It is the object of the present invention to provide in a valve having a toggle device by which the valve can not only be easily opened and shut and by which the valve when it is shut will be prevented in a manner well understood from reopening under the influence of the pressure acting upon the valve, means whereby the valve is prevented after it has been opened from reclosing should any pressure act on the valve with a reclosing tendency, and to provide, if desired, means for relieving the toggle from the greater part of the stresses set up by fluid pressure against one side of a closed valve.

The present invention therefore comprises the combination with a reciprocating valve, a guide by which it is guided in its reciprocation, and a shaft, of a crank on the shaft and a connecting rod, the last two constituting a toggle which forms the operative connection between the shaft and valve, and of an operating arm or other projection from the shaft and two fixed stops against one of which the projection abuts in the closing of the valve and against the other of which it abuts in the opening of the valve, the said combination being characterized by the stops, the projection and the toggle being so arranged in relation to one another that the toggle will not only be stopped by one of the stops after the valve is shut, in a position of the two links of the toggle wherein they are to that side of a line beyond which the fluid-pressure acting on the valve tends to keep them in its tendency to re-open the valve, but will also be stopped by the other stop, after the valve is open, in a position of the two links of the toggle wherein they are to the same side of the said line beyond which line the fluid pressure acting on the valve tends to keep them if it should tend to reclose the valve.

The present invention comprises also the combination aforesaid applied to a valve which (for instance as in Figure 1 hereinafter described) is moved by the toggle to shut against an abutting seat with the resilient facing by which latter the greater part of any pressure on the back of the valve tending when it is shut to force it toward the toggle will be intercepted, whereby the toggle is relieved of the stress of such pressure. Or the toggle may be resilient, whereby any such pressure tending to force the closed valve toward the toggle, relieves the tensional stress in the toggle.

In the accompanying drawings:—

Fig. 4 is a view similar to Fig. 1 of a modified construction of the valve and appurtenances shown in Figs. 1 and 2;

Fig. 5 is a vertical central section through a piston-valve according to the present invention, with the valve shut; and Fig. 6 is a view of the piston-valve of Fig. 5, open.

Like reference-letters indicate like parts throughout the drawings.

Figure 1:
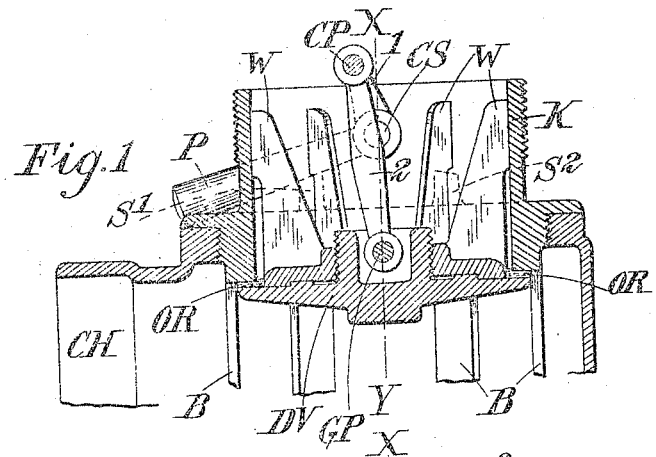
Fig. 1 is a vertical central section through a valve combined with a toggle according to the present invention, the valve being shown closed.
Figure 2:
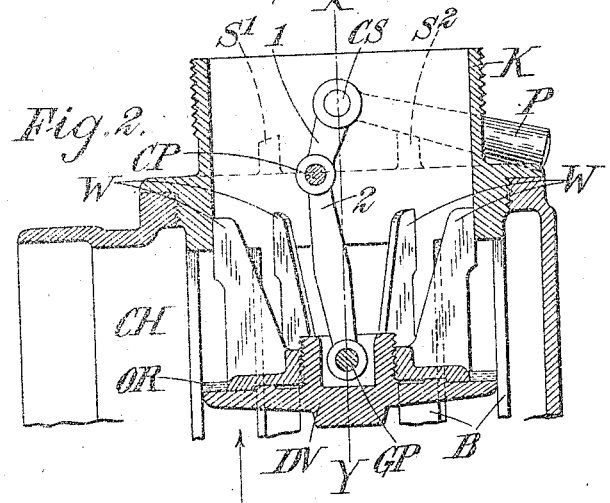
Fig. 2 is a view of the construction illustrated in Fig. 1 but with the valve held open.
Figure 3:
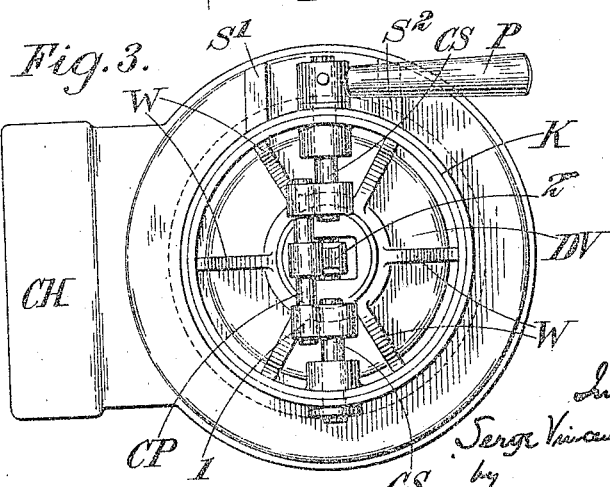
Fig. 3 is a plan view of the valve of Figs. 1 and 2.

With reference first to Figs. 1, 2 and 3 the valve in this example is a disk-valve DV which seats itself against a resilient obturating ring OR hereinafter again referred to and which is seated between the lower end of a pipe K and the valve; when thus abutted against the lower end of K any pressure against the underside of the valve tending to force it toward the toggle 1, 2 above it, hereinafter described, will be taken on the resilient ring OR between the bottom end of the pipe and the valve whereby the toggle will be relieved of such pressure except for the small share of it resisted by the weight of a radial projection P, hereinafter described. The pipe K forms a conduit by which fluid under pressure in K can be led to the interior of a chamber CH with which the conduit K is in communication. Wings W attached to the disk-valve extend into and fit the interior of the pipe K which, together with bars B extending downward from the lower end of the pipe K and bearing against the edge of the disk, serve to guide the valve DV during its reciprocations toward and away from the end of the pipe. A crank-shaft CS is journaled transversely in the wall of the pipe K and on this crank-shaft a crank 1 is fixed carrying a crank-pin CP. From the crank-pin extends a connecting-rod 2 to a gudgeon-pin GP, the latter being fixed in the disk-valve. The crank 1 and connecting-rod 2 constitute a toggle which forms the operative connection between the crank-shaft CS and the valve.

From the crank-shaft extends a radial projection P which in the illustration is shown as a handle for operating the valve. A stop $S^1$ for this projection P is provided on the flange of the pipe K at the left hand of the shaft CS in Fig. 1. The stop $S^1$, the projection P and the toggle 1, 2 are so arranged in relation to one another that the toggle will be stopped by the stop, after the valve is shut, in a position of the two links of the toggle such as that in which they are shown in Fig. 1; in this position of the toggle it is over-set, that is to say, the links are situated to the left-hand side of a line X—Y passing through the center of the crank-shaft CS and the center of the gudgeon-pin GP. The links 1, 2 of the toggle pass through this line in the operation of closing the valve and any fluid-pressure acting on the upper side of the valve and tending to re-open it tends only to keep them to the left-hand side of that line and keeps the projection P hard up against the stop $S^1$ so that the toggle and stop together prevent the valve from being accidentally re-opened by fluid-pressure on top of it. Just before the links 1, 2 of the toggle arrive in the position in which they are shown in Fig. 1, they will both be in the vertical line X—Y, and at that moment the disk-valve DV will be slightly spaced from the lower end of the pipe, the obturating ring OR being compressed between the bottom end of the pipe K and the valve and closing the pipe. In passing onward to the left out of the line X—Y the links will return the valve DV downward slightly. To insure that this slight downward movement shall not re-open the valve, there must be the aforesaid elastic obturating-ring OR on the face of the valve, as in Figs. 1 and 2, compressible between the disk-valve DV and the bottom end of the pipe K and expanding automatically during the slight downward movement of the valve aforesaid to keep closed the passage between the valve and its seating; or as in Fig. 4 the bottom end of the pipe K must be provided with a supplemental facing $K^1$ with an obturating-ring OR behind it for a like purpose, or with a connecting-rod 2, as in Fig. 4, which is telescopic, being in two parts $2^a$ and $2^b$ with a spring S between them tending always to pull them together and so to enable them to keep the disk-valve DV hard up against its seating while the parts 1 and 2 of the toggle pass through the vertical line X—Y into the position in which they are shown in Figs. 1 and 4. In Fig. 4 any upward pressure on the closed valve does not produce tensional stress in the parts $2^a$ $2^b$. The yielding connecting-rod or the obturator-ring may either of them be used, or both of them may be employed in the same valve.

A second stop $S^2$ at the right-hand side of the crank-shaft CS in Fig. 1 on the flange of the pipe K is used to stop the toggle after the valve is open in a position in which the two links 1 and 2 of the toggle are again to the left-hand side of the vertical line X—Y; when they are beyond this line to the left, as shown in Fig. 2, the weight of the handle P as against the weight of the valve and toggle is sufficient to keep them there, and any fluid-pressure which might act on the valve in the direction of the arrow, and tend to move it in a direction to reclose it, will only serve to tend to bend the toggle more and will keep the projection P hard up against the stop $S^2$ so that the valve will not accidentally re-close.

In Figs. 5 and 6 the valve employed is a piston-valve sliding over ports PT in a conduit K and operated by a projection P which is a handle, as in the former example. The valve is shut in Fig. 5, and the stop is arranged so that in this position the parts of the toggle 1, 2 are "buckled" to the left of the vertical line X—Y, and the weight of the handle P as against the weight of the valve and toggle is sufficient to keep them there.

In Fig. 6 the valve is open. In this construction there need be no obturating-ring and no elasticity in the device because the slight return movement of the valve which takes place upward in Fig. 5 as the parts 1 and 2 of the toggle pass through the vertical line X—Y is not sufficient to open the ports PT.

What I claim as my invention and desire to secure by Letters Patent is:—

1. The combination with a reciprocating valve, a guide by which it is guided in its reciprocation, a shaft, a crank on the shaft, a connecting rod, said crank and connecting rod constituting a toggle which forms the operative connection between the shaft and the valve, an operating arm connected to the shaft, two fixed stops against one of which the operating arm abuts in the closing of the valve and against the other of which said arm abuts in the opening of the valve, the arm and toggle being so arranged in relation to each other that the toggle will be stopped by one stop after the valve is shut in a position wherein the links of the toggle are to that side of a line beyond which the fluid pressure acting on the valve tends to keep them in its tendency to reopen the valve, and which will also be stopped by the other stop after the valve is open, wherein the links of the toggle are to the same side of the said line beyond which fluid pressure acting on the valve tends to keep them if the pressure should tend to reclose the valve.

2. The combination with a reciprocating valve, a seat therefor, a guide by which said valve is guided in its reciprocation, a shaft, a crank on the shaft, a connecting rod, said crank and connecting rod constituting a toggle which forms the operative connection between the shaft and the valve, an operating arm connected to the shaft, two fixed stops against one of which the operating arm abuts when the valve is closed, said arm and toggle being so arranged that the toggle is overset when said valve is closed and the arm engages said stop whereby any pressure on the back of the valve tending when it is shut to force it toward the toggle will be intercepted by the seat whereby the toggle is relieved of the stress of such pressure, and the arm abutting against the other of said stops in the opening of the valve.

In testimony whereof I affix my signature.

SERGE VINCENT DE BOLOTOFF.